3,344,111
PREPARATION OF STABLE COPOLYMERIZA-
BLE ORGANOSILICON COMPOSITIONS CON-
TAINING A PLATINUM CATALYST AND AN
ACRYLONITRILE TYPE COMPOUND
Alan J. Chalk, Scotia, N.Y., assignor to General Electric
Company, a corporation of New York
No Drawing. Filed Sept. 28, 1966, Ser. No. 582,525
18 Claims. (Cl. 260—46.5)

ABSTRACT OF THE DISCLOSURE

A process for reducing the activity of a platinum catalyst in the presence of a mixture of reactants comprising an olefinpolysiloxane and a hydrogen polysiloxane by means of a nitrile compound.

---

This invention is concerned with the production of stable mixtures of copolymerizable organosilicon compositions containing a platinum catalyst. More particularly, the invention relates to a process for reducing the activity of a platinum catalyst in the presence of a mixture of reactants comprising (a) an alkenylpolysiloxane having structural units of the formula (I) 

$$R_a R'_b SiO_{(4-a-b)/2}$$

and (b) a hydrogen polysiloxane having structural units of the formula (II) 

$$R_a SiH_b SiO_{(4-a-b)/2}$$

where R is an organic radical attached to silicon by a C—Si linkage and is selected from the class consisting of monovalent hydrocarbon radicals, halogenated monovalent hydrocarbon radicals and cyanoalkyl radicals, R' is an organic radical attached to silicon by a C—Si linkage and contains aliphatic carbons linked by multiple bonds (e.g., vinyl, allyl, methallyl, butenyl, ethinyl, etc.), $a$ has a value of 0 to 3, inclusive, and preferably from 0.5 to 2, $b$ has a value from 0.005 to 2.0, inclusive, and the sum of $a+b$ is equal to from 0.8 to 3, inclusive, and preferably from 1 to 3, inclusive, which process comprises incorporating in the platinum-containing mixture of ingredients a ligand composed of an acrylonitrile type compound (hereinafter indentified as "nitrile compound" broadly) corresponding to the formula (III) 

$$Q-\overset{H}{\underset{Z}{C}}=C-CN$$

where Q is the member selected from the class consisting of hydrogen and monovalent hydrocarbon radicals, and Z is a member selected from the class consisting of halogens, hydrogen, and monovalent hydrocarbon radicals. The invention also includes coreactable or copolymerizable compositions composed of the aforesaid alkenyl polysiloxane and hydrogen polysiloxane in which the activity of the platinum catalyst is reduced or inhibited by the presence of the above said ligands.

It is known in the art that a number of platinum-containing materials will catalyze the addition of silicon-bonded hydrogen across the double bonds of carbons separated by olefinic unsaturation (this coreaction will also be referred to hereinafter as "copolymerization"). Thus, U.S. Patent 2,970,150—Bailey shows the use of a paltinum-on-charcoal catalyst for the addition of organopolysiloxanes containing silanic hydrogen (Si—H) to compounds containing olefinic unsaturation. U.S. Patent 2,823,218—Speier et al. shows the use of chloroplatinic acid for the same types of reaction. In the following U.S. patents (all of which are assigned to the same assignee as the present invention), U.S. 3,159,622—Ashby, U.S. 3,159,601—Ashby, and U.S. 3,220,972—Lamoreaux, are disclosed and claimed other types of platinum-containing catalysts for the addition of organopolysiloxanes containing silanic hydrogen to compounds containing olefinic unsaturation.

The processes described in the aforesaid Ashby and Lamoreaux patents are especially adaptable to reacting low molecular weight organopolysiloxanes (free of olefinic unsaturation) containing silanic hydrogen with low molecular weight organopolysiloxanes containing olefinic unsaturation and free of any silanic hydrogen, to form high molecular weight copolymers by the addition of the silanic hydrogen to the olefinic unsaturation. It is often desirable to incorporate the platinum catalyst designed to effect this addition reaction, in the mixture of organopolysiloxanes and carry out this addition reaction at some future time by the application heat. Unfortunately, such mixtures of the aforesaid organopolysiloxanes and the platinum catalyst do not have the shelf life or the ability to remain stable or unchanged at ambient or room temperatures (about 20–30° C.) for sufficient periods of times required for commercial exploitation. Thus, it has been found that in many instances, on standing, the platinum-containing catalyst causes the mixture of ingredients to increase undesirably in viscosity and therefore in molecular weight; often this increase in viscosity and molecular weight is so rapid that before use is made of the mixture, it has gelled to a state which has no utility.

I have now discovered that a mechanical mixture or a preformed complex of a platinum-containing catalyst and a nitrile type compound of Formula III unexpectedly reduces the activity of platinum catalyst used to effect addition of the silanic hydrogen of the hydrogen organopolysiloxane to the olefinic unsaturation of the alkenyl-polysiloxane. This stability or reduced activity is particularly noticeable at temperatures of the order of from about 20–30° C. If at some future time it should be desired to reactivate the platinum catalyst to overcome the inhibiting effect of the ligand so as to effect addition of the silanic hydrogen to the olefinic unsaturation, it is only necessary to heat the mixture of ingredients at a temperature in excess of 40° C., for instance, at temperatures above 60° C.

In the description which follows, the following definitions will be used:

"Alkenyl polysiloxane" is intended to cover broadly organopolysiloxanes preferably but not essentially free of silanic hydrogen but containing olefinic unsaturation by means of a double or triple bond between two adjacent aliphatic carbon atoms (Formula I).

"Hydrogen polysiloxane" is intended to cover broadly organopolysiloxanes preferably but not essentially free of olefinic unsaturation (such as in Formula II).

"Platinum catalyst" is intended to include any platinum-containing composition suitable for effecting the addition of silanic hydrogen to the above-mentioned olefinic unsaturation, where preferably the platinum catalyst is soluble in either the hydrogen polysiloxane or the alkenyl polysiloxane, or both.

"Ligand" is intended to mean the acrylonitrile type compound covered by Formula III which is added to the mixture of the platinum catalyst and the aforesaid polysiloxanes in an amount sufficient to reduce or temporarily inhibit the catalytic activity of the platinum catalyst in the presence of the alkenylpolysiloxane and the hydrogen-polysiloxane.

The platinum catalyst employed in the practice of the present invention is one which is soluble in either of the organopolysiloxanes and preferably is soluble in both the hydrogenpolysiloxane and the alkenylpolysiloxane, or can be incorporated in the coreactants as a suitable solution, e.g., an ethanol solution of the platinum catalyst. Among such catalysts may be mentioned, platinic chloride, platinum sulfate, salts of chloroplatinous acids such as $$Na_2PtCl_4$$

chloroplatinic acid, etc. Chloroplatinic acid is one of the more preferred compositions and is economically obtained as a hexahydrate, $H_2PtCl_6 \cdot 6H_2O$, although the dehydrated form can also be employed.

Another soluble platinum catalyst which can be employed in the present invention is described in the above-mentioned Lamoreaux patent, U.S. 3,220,972, which by reference is made part of the disclosures of the instant application. These platinum-containing compounds are prepared by (A) forming a reaction mixture of (1) chloroplatinic acid with (2) at least about 2 moles per gram atom of platinum of either an alcohol (e.g., butanol, octyl alcohol, myricyl alcohol, etc.) or an aldehyde (e.g., amyl aldehyde, octyl aldehyde, tetradecanal, etc.) or an ether (e.g., dibutyl ether, diamyl ether, dimyristyl ether, etc.), and (B) heating said reaction mixture at a temperature of from about 60 to 80° C. at a reduced pressure until the reaction mixture has a ratio of from about 2.0 to about 3.5 atoms of chlorine per atom of platinum.

A detailed description of the method of preparing the platinum-containing catalyst within the scope of the Lamoreaux patent is as follows. One mole of chloroplatinic acid hexahydrate and 7 moles of octyl alcohol are mixed together until a homogeneous solution is formed. The reaction mixture is then heated to a temperature of 70° C. and maintained at this temperature under a pressure of 25 millimeters for about 40 hours, while continuously removing HCl and water which are formed during the reaction. During the course of the reaction, the chlorine to platinum ratio gradually falls from 6 atoms of chlorine per atom of platinum to 2 atoms of chlorine per atom of platinum. At the end of 40 hours, the reaction mixture is cooled to room temperature and the product is extracted with hexane, filtered, and hexane removed from the filtrate under vacuum. At this point, the catalyst appears to be a complex of $PtCl_2$ and an ether and aldehyde derived from octyl alcohol; specifically, the complex by analysis showed that it contains 1 mole of octyl aldehyde to 2 moles of octyl ether and 1 mole of platinum to 2 moles of chlorine.

Another class of platinum catalysts which can be employed in the present invention are platinum-olefin complexes characterized by the complexes found in the aforementioned Ashby Patent 3,159,601 (which by reference is made part of the disclosures of the instant application) of the formulae:

(IV)      [PtCl₂·Olefin]₂

(V)      H[PtCl₃·Olefin]

While the olefin portion of the complexes of Formulas IV and V can be almost any type of olefin, it is preferred that the olefin portion is a hydrocarbon alkene having from 2 to 10 carbon atoms, a cycloalkene having from 5 to 7 carbon atoms, or styrene. Specific examples of olefins useful in making these platinum-olefin complexes are, e.g., ethylene, propylene, the various isomers of butylene, octylene, cyclopentene, cyclohexene, cycloheptene, etc.

The catalysts within the scope of Formulas IV and V are well known in the art, and their preparation and properties are described, for example, in "Coordination Compounds of Olefins with Metallic Salts," R. N. Keller, Chemical Reviews, 1940–41, 27–28, pages 229–267; and Joy and Orchin, Journal of the American Chemical Society, 81, pages 305–311 (1959).

A still further class of platinum catalysts useful in the present invention are those disclosed and claimed in the aforesaid Ashby Patent 3,159,662, comprising a platinum-cyclopropane complex having the formula (VI)      $(PtCl_2 \cdot C_3H_6)_2$ which is described by C. F. H. Tipper, J. Chem. Soc., 2045–6 (1955), who shows one method of preparing this complex by effecting reaction between cyclopropane and chloroplatinic acid. Another method of forming the complex of Formula VI is by effecting reaction between a platinum ethylene complex having the formula $(PtCl_2 \cdot C_2H_4)_2$ and cyclopropane. The platinum-ethylene complex is described, for example, in the aforesaid articles by Keller and by Joy and Orchin (supra).

A still further class of platinum catalysts which can be employed with the ligands herein described are those platinum complexes which are in the form of platinum carboxylates. These platinum carboxylates can be obtained by reacting a platinum halide (e.g., platinum chloride) and a water-soluble salt of an organic acid in the molar ratio of from 3 to 6 or more moles of the salt of the organic acid per mole of the platinum halide, advantageously employing water or an aliphatic alcohol as the medium in which the reaction is carried out. Any platinum halide can be employed as, for instance, platinic chloride, platinic bromide, platinous bromide, platinic chloride octahydrate ($PtCl_4 \cdot 8H_2O$), chloroplatinic acid $$(H_2PtCl_6 \cdot 6H_2O)$$

etc.

Among such salts may be mentioned the alkali-metal salts of monocarboxylic acids (both saturated and aromatic acids), for instance, the alkali-metal salts of butyric, hexanoic, octanoic, benzoic, etc., acids. The inorganic portion of the water-soluble salt may be, for instance, sodium, potassium cesium, ammonium, etc. The proportions of ingredients used to make the platinum carboxylate can be varied widely and this method yields a soluble platinum salt (or carboxylate) with a minimum of processing. The platinum salt precipitates from the aqueous solution if a suitable alkali-metal salt of a carboxylic acid is used. When an alcohol is used (e.g., ethanol) as the medium, the desired platinum salt remains in solution but the ionic salt, e.g., the sodium chloride, precipitates. Although the structure of this salt is not known precisely, nevertheless it is believed that when water is used as the medium these platinum carboxylates conform to the empirical formula $$Pt(O\overset{O}{\overset{\|}{C}}R)_{e-n}(OH)_n$$

where R has the meaning given above, $n$ is a value from 0 to 1, inclusive, and $e$ is either 2 or 4. Where the medium is an aliphatic alcohol, $n=0$ and the platinum carboxylate is substantially free of platinum-bonded hydroxyl groups.

Among the organic radicals which R in Formulas I and II may represent are, e.g., monovalent hydrocarbon radicals free of olefinic unsaturation, halogenated monovalent hydrocarbon radicals free of olefinic unsaturation, cyanoalkyl radicals, etc. More particularly, radicals represented by R include alkyl radicals (e.g., methyl, ethyl, propyl, isopropyl, butyl, octyl, etc., radicals); cycloalkyl radicals (e.g., cyclopentyl, cyclohexyl, cycloheptyl, etc., radicals); aryl radicals (e.g., phenyl, naphthyl, tolyl, xylyl, etc., radicals); aralkyl radicals (e.g., benzyl, phenylethyl, phenylpropyl, etc., radicals); halogenated derivatives of the above radicals, including chloromethyl, trifluoromethyl, chloropropyl, chlorophenyl, dibromophenyl, tetrachlorophenyl, difluorophenyl, etc., radicals; and cynaoalkyl radicals, e.g., beta-cyanoethyl, gamma-cyanopropyl, beta-cyanopropyl, etc., radicals. Preferably, at least 25 percent and as much as 50 percent of the R groups attached to silicon in the polysiloxanes of Formulas I and II are methyl radicals, and R' is preferably an alkenyl radical, e.g., vinyl, allyl, methallyl, butenyl, etc.

The hydrogenpolysiloxanes which are employed in the practice of the present invention can also be characterized as homopolymers or copolymers containing at least one unit per molecule having the formula:

(VII)      $(R)_c(H)_dSiO_{\frac{4-c-d}{2}}$ with the remaining siloxane units, if any, in the organopolysiloxane having the formula:

(VIII) $\quad (R)_n SiO_{\frac{4-n}{2}}$ where R is as previously defined, c has a value of from 0 to 2, inclusive, d has a value of from 1 to 2, inclusive, the sum of $c+d$ is equal to from 1.0 to 3.0, inclusive, and n has a value of from 0.8 to 2.5, inclusive. Within the scope of Formula VII are siloxane units such as hydrogen siloxane units $(HSiO)_{1.5}$, methyl hydrogen siloxane units $(HSiCH_3O)$, dimethyl hydrogen siloxane units, and dihydrogen siloxane units $(H_2SiO)$. The copolymers containing the siloxane units of Formula VII and the siloxane units of Formula VII are present in proportions so as to form a hydrogenpolysiloxane within the scope of Formula II. In general, the copolymers contain from 0.5 to 99.5 mole percent of the siloxane units of Formula VI with from 0.5 to 99.5 mole percent siloxane units of Formula VII.

The hydrogen polysiloxanes are well known in the art and include such materials as 1,3-dimethyldisiloxane, 1,1,3-trimethyldisiloxane, 1,1,3,3-tetramethyldisiloxane as well as higher polymers containing up to 100,000 or more silicon atoms per molecule. Also included within the scope of Formula II are cyclic materials such as the cyclic polymers of methyl hydrogen siloxane having the formula $(CH_3SiHO)_x$ where x is a whole number equal to from 3 to 10 or more.

The alkenyl polysiloxanes of Formula I which are employed in the practice of the present invention are also well known in the art and can also be characterized as copolymers of (1) siloxane units having the formula (IX) $\quad (R)_c(R')_d SiO_{\frac{4-c-d}{2}}$ where R, R', c, d and the sum $c+d$ are as previously defined, with (2) an organopolysiloxane within the scope of Formula VIII. Where the alkenyl polysiloxane is a copolymer of units within the scope of Formula IV with an organopolysiloxane having an average formula within the scope of Formula VIII, the copolymer generally contains from 0.5 to 99.5 mole percent of the units of Formula IX, and from 0.5 to 99.5 mole percent of units within the scope of Formula VIII.

The preparation of the unsaturated organopolysiloxanes within the scope of Formula I is well known in the art. Included within the scope of the siloxanes of Formula I are low molecular weight materials such as vinylpentamethyldisiloxane, 1,3-divinyltetramethyldisiloxane, 1,1,3-trivinyltrimethyldisiloxane, 1,1,3,3 - tetravinyldimethyldisiloxane as well as higher polymers containing up to 100,000 or more silicon atoms per molecule. Also included within the scope of the alkenylpolysiloxanes within the scope of Formula I are cyclic materials containing silicon-bonded vinyl or allyl radicals, such as the cyclic trimer, tetramer or pentamer of methylvinylsiloxane $[(CH_2=CH)(CH_3)SiO]$ or methyl allylsiloxane $[CH_2=CH-CH_2)(CH_3)SiO]$ The nitrile compound, particularly acrylonitrile, employed in the practice of the present invention can be used as an admixture with the platinum catalyst in combination with the alkenyl polysiloxane and hydrogen polysiloxane. Preferably, especially when using ligands other than acrylonitrile, the ligand is reacted with the platinum catalyst before adding it to the mixture of polysiloxanes. Among such nitrile compounds may be mentioned, for instance, acrylonitrile, methacrylonitrile, α-chloroacrylonitrile, cinnamonitrile, allyl cyanide, crotononitrile, etc.

In carrying out the process of the present invention, preferably the platinum catalyst and ligand are mixed together, and this mixture is added to the mixture of the alkenyl polysiloxane and the hydrogen organopolysiloxane in the desired proportions. In this condition, the mixture of ingredients can be maintained at temperatures of from about 20–30° C. and advantageously for extended periods of time, without any undesirable change in the viscosity of the mixture. Alternatively, the platinum catalyst, preferably in the platinous form, and the ligand can be reacted together, e.g., at about 75 to 150° C. to form a preformed platinous-ligand complex which in turn can be added to the mixture of coreactive polysiloxanes.

The proportions of the various ingredients employed in the practice of the present invention can vary within wide limits and these proportions of the ingredients are not affected by the stoichiometry of the addition reactants involved, since many of the products prepared by the process of this invention exhibit satisfactory properties for intended purposes even when the final product contains unreacted silicon-bonded alkenyl radicals or unreacted silicon-hydrogen linkages. However, for economic reasons, it is generally preferred that the alkenylpolysiloxane and the hydrogen polysiloxane be present in such proportions that the reaction mixture contains from about 0.005 to 20 silicon-hydrogen linkages per silicon-bonded alkenyl radical. Also, it is desirable to have an equal number of silicon-hydrogen linkages and alkenyl radicals in the reaction mixture so as to produce a final product which would be substantially free of either silicon-hydrogen linkages or silicon-bonded alkenyl radicals.

The platinum catalyst is generally added to the reaction mixture in an amount related to the amount of alkenyl (e.g., vinyl or allyl) radicals in the alkenyl polysiloxane to be reacted. One especially desirable feature of the present invention is that the platinum catalyst can be added in a variety of concentrations and still act satisfactorily as the catalyst for the addition of the silanic hydrogen to the alkenyl radicals, relying on the ability of the ligand to retard the activity of the platinum catalyst until such time as it is desired to reactivate the platinum catalyst by means of elevated temperatures. Satisfactory action can occur when the platinum catalyst is present in amounts sufficient to provide as little as one atom of platinum per million silicon-bonded alkenyl groups in the alkenyl polysiloxane. Amounts of the platinum catalyst sufficient to provide as high as one to ten platinum atoms per 1000 silicon-bonded alkenyl radicals can also be employed. In general it is preferred to employ the platinum catalyst in an amount sufficient to provide one platinum atom per one thousand to one million silicon-bonded alkenyl groups in the alkenyl polysiloxane to be reacted.

When employing exceptionally small quantities of the platinum catalyst, it is often desirable to dissolve the latter in a solvent which is inert to the reactants under the conditions of the reaction so as to facilitate uniform dispersion or solution of the platinum catalyst in the alkenyl polysiloxane and the hydrogen polysiloxane. Suitable solvents include, for example, hydrocarbon solvents such as xylene, benzene, toluene, mineral spirits, halogenated alkanes, and the like, as well as oxygenated solvents, such as dioxane, ethanol, butanol, tetrahydrofuran, etc. Where a diluent or solvent is employed, the amount of the latter is not critical. Satisfactory solutions of platinum catalysts can be prepared which contain from about 0.1–0.0001 gram of platinum catalyst per gram of solvent.

The amount of nitrile compound used can also be varied depending upon such characteristics as the type and amount of platinum catalyst used, the degree of inactivity desired to impart to the platinum catalyst and very often the type of alkenyl polysiloxane and hydrogen polysiloxane employed. Generally, it is desirable that the ligand be employed in an amount in excess of 1 mole of the ligand per mole of the platinum catalyst and preferably from 2 to 1000 or more moles of the ligand per mole of platinum catalyst. If increased inhibition is desired, the amount of the ligand will be increased, while if it is desired that the catalysts be activated at a lower temperature or more rapidly, then the amount of ligand used will be smaller. As the concentration of the platinum catalyst increases in the mixture of the alkenyl polysiloxane and the hydrogen polysiloxane, the rate of reaction at elevated temperature will also be increased and will correspondingly require a larger amount of the ligand to suppress the activity at the temperatures at which the mixture of the ingredients will be stored.

The characteristics of the products prepared in accordance with the process of the present invention can vary greatly with the nature of the starting materials. For example, when a reaction mixture comprises vinyl pentamethyldisiloxane and pentamethyldisiloxane, reaction products of the materials contain two disiloxanes joined by a silethylene group. In the case of a reaction mixture which contains a compound such as 1,1,3,3-tetramethyldisiloxane and a higher molecular weight organopolysiloxane containing a plurality of silicon-bonded vinyl or allyl groups per molecule, the resulting product is a crosslinked silicone.

If at some future time, it is desired to effect the addition reaction between the alkenyl radical and the silanic hydrogen, one can heat the mixture of ingredients at elevated temperatures, for example, temperatures ranging from as low as 50° C. up to temperatures of the order of 150° C. or even higher.

The time required for effecting the final addition reaction can also vary within wide limits depending upon the particular reactants involved, the proportions of the reactants, the reaction temperature, the type and amount of platinum catalyst used, the type and concentration of the nitrile compound, etc. By suitable selection of the platinum catalyst, ligand and reactants, reaction can be effected in times which may vary from a few minutes up to 24 hours or more. If all other factors are equal, the rate of reaction increases as the temperature and as the concentration of the platinum catalyst increase and as the concentration of the ligand decreases.

In order that those skilled in the art may better understand how the present invention can be practiced, the following examples are given by way of illustration and not by way of limitation. All parts and percents are, by weight, unless otherwise indicated.

One mixture of ligand and platinum catalyst employed in these examples was prepared by reacting two parts of a 0.4%, by weight, ethanol solution of chloroplatinic acid, with 2 parts of the particular nitrile compound, and 10 parts of triethylsilane at 100° C. for one hour. This platinum-ligand mixture will hereinafter be referred to as "Preformed platinum-ligand mixture No. 1."

Another mixture of ligand and platinum catalyst was prepared by reacting together 2 parts of a 0.38%, by weight, of an ethanolic solution of sodium chloroplatinite with 2 parts of the particular nitrile compound, and then refluxing the mixture at 100° C. for from 1 to 6 hours, the time varying with the particular ligand. This reaction product will hereinafter be referred to as "Preformed platinum-ligand mixture No. 2."

In each of the following examples, the alkenyl polysiloxane and hydrogen polysiloxane were present in equal parts, by weight, and were respectively the vinyl methylcyclopolysiloxane having the formula $$[(CH_2=CH)(CH_3)SiO]_4$$

and the methyl hydrogen cyclopolysiloxane having the formula $[CH_3SiHO]_4$. Unless otherwise stated, each platinum-ligand mixture was employed so that 30 parts per million (of the mixture of polysiloxanes) platinum was present calculated as chloroplatinic acid.

*Example 1*

In this example 50 parts of the vinyl methylcyclopolysiloxane and 50 parts of the methyl hydrogencyclopolysiloxane were added to the Preformed platinum-ligand mixture No. 1. In each instance, the amount of nitrile compound present was equal to 2%, by weight, based on the weight of the two polysiloxanes. Similar mixtures were prepared for each of the nitrile compounds of Formula III.

The various mixtures containing the different nitrile compounds in the forms of the reaction product with the platinum catalyst, were then tested by heating the mixtures at 100° C. until the liquid polysiloxane mixture was converted to a non-flowing gel; this gel point at which the coreaction product was a soft, resilient, rubber-like product, was taken as the reference point for time stability. Table I shows the various nitrile compounds used, and the time in minutes required to effect gelation of the polysiloxane mixture at 100° C. Acetonitrile was also tested in the same amount as the nitrile compound to determine the effect of saturation in the nitrile compound.

TABLE I

| Example No. | Nitrile Compound in Complex | Time in Minutes to Gel |
|---|---|---|
| 1 | None | <1 |
| 2 | Acrylonitrile | 220 |
| 3 | Methacrylonitrile | 160 |
| 4 | 2-chloroacrylonitrile | 255 |
| 5 | Crotononitrile | 300 |
| 6 | Cinnamonitrile | 280 |
| 7 | Allyl cyanide | 40 |
| 8 | Acetonitrile | <1 |

*Example 2*

The same procedure, ingredients, and concentrations of ingredients were repeated in this example as in Example 1 with the exception that the reaction mixture of the platinum catalyst and ligand comprised Preformed platinum-ligand mixture No. 2. The following Table II shows the nitrile compound employed in each instance, the time within which the platinum catalyst and ligand were reacted, and the time in hours to effect gelation of the mixture of cyclic polysiloxanes.

TABLE II

| Example No. | Ligand | Time of Heating of Ligand and Platinum Catalyst | Time to Gelation, hours |
|---|---|---|---|
| 9 | Acrylonitrile | 1 | >10 |
| 10 | Methacrylonitrile | 6.0 | >9 |
| 11 | Crotononitrile | 1 | >10 |
| 12 | 2-chloroacrylonitrile | 1 | ca 7.5 |

*Example 3*

In this example, a mechanical mixture was prepared of 2 parts of a 0.4%, by weight, ethanol solution of chloroplatinic acid, 1 part acrylonitrile and 50 parts each of the cyclic polysiloxanes recited in Example 1. The mixture of ingredients was heated at 100° C. to determine the period of gelation of the polysiloxane mixture in the same manner as was done for Examples 1 and 2. It was found that gelation did not occur until about 50 minutes after the heating was begun, showing the inhibiting effect of the acrylonitrile when used initially in the form of a blend with the platinum catalyst and the copolymerizable ingredients.

While the foregoing examples have illustrated various embodiments of the present invention, it should be understood that other platinum catalysts (which is not intended to include metallic platinum) and other nitrile compounds (either as mechanical mixtures with the platinum catalyst or in the preformed state with the platinum catalyst), many examples of which have been given previously, can be used in a wide range of proportions without departing from the scope of the invention.

Furthermore, it should be recognized that in addition to the vinyl polysiloxane and hydrogen polysiloxane employed in the foregoing examples, other alkenyl polysiloxanes and hydrogen polysiloxanes can be employed, many of which have been referred to and described above. Among the alkenyl polysiloxanes which can be used with success are, for example, the methyl vinyl polysiloxane fluids chain stopped with trimethylsiloxy units, which can be prepared by conventional procedures from hexamethyldisiloxane, octamethylcyclotetrasiloxane, and the cyclic tetramer of methyl vinylsiloxane. This fluid, when prepared using the requisite proportions of ingredients, contains about 0.3 mole percent methyl vinylsiloxane units and has a viscosity of about 500 centipoises at 25° C. This vinyl polysiloxane can then be coreacted with a polymeric methyl hydrogen polysiloxane fluid which can be prepared, for instance, by the cohydrolysis of methyldichlorosilane and dimethyldichlorosilane in amounts sufficient to provide 2.5 mole percent of the methyl hydrogensiloxane unit, which when prepared in the usual fashion, will be found to have a viscosity of around 150 centipoises at 25° C. The addition of any of the aforementioned platinum catalysts together with the nitrile compound yields mixtures which can be maintained in a highly stable condition for long periods of time, but can readily be caused to coreact by raising the temperature sufficiently to overcome the inhibiting effect of the nitrile compound.

A still further vinyl polysiloxane which can be used is a methyl phenylvinylpolysiloxane prepared from hexamethyldisiloxane, octamethylcyclotetrasiloxane, tetrameric methyl phenylcyclopolysiloxane, and the tetrameric methyl vinylcyclopolysiloxane. By proper selection of the coreactants in making this methyl phenylvinylpolysiloxane, one can obtain a fluid having a viscosity of about 1500 centipoise at 25° C. and containing 0.5 mole percent methyl vinylsiloxane units and 27.8 mole percent methyl phenylsiloxane units.

A still further hydrogen polysiloxane which can be employed in combination with the alkenylpolysiloxane is one prepared by cohydrolyzing methyl dichlorosilane, methyl phenyldichlorosilane, and dimethyldichlorosilane, which by proper choice of the ingredients, will yield a fluid having a viscosity of about 300 centipoises at 25° C. and will contain 5 moleu percent methyl hydrogen siloxane units and 24 mole percent methyl phenylsiloxane units. Additional platinum-catalyzed mixtures of alkenyl polysiloxanes and organohydrogen polysiloxanes which may be used in the practice of the present invention may be found disclosed and claimed in the copending application of Frank J. Modic, Ser. No. 514,650, filed Dec. 17, 1965 and assigned to the same assignee as the present invention.

The proportions of ingredients including the platinum catalyst, the nitrile compound, alkenyl polysiloxane and hydrogen polysiloxane can be varied within wide limits as recited previously without departing from the scope of the invention. The presence of various fillers is not precluded.

The products prepared by the addition of the coreactants described in the instant application have utility in various fields. Thus, the products formed from reacting the alkenyl polysiloxane with the hydrogen polysiloxane can be used in conventional silicone polymer applications. For example, it is possible to prepare these coreaction products in any shape desired, either in the unsupported or supported state. Those materials which ordinarily are rubbery polymers can be used as gaskets and the like similar to the number in which conventional silicone rubbers are employed. Those materials which are resinous in character can be used as insulation for electrical conductors and after effecting the coreaction at the elevated temperatures between the alkenylpolysiloxane and hydrogen polysiloxane, the electrical conductors can be used for conventional applications. The coreacted composition can also be used as potting gels for various types of electrical equipment, e.g., in making capacitors and the like.

What I claim as new and desire to secure by Letters Patent of the United States is:

1. The process for reducing the activity of a platinum catalyst effective to cause copolymerization of a mixture of copolymerizable ingredients comprising (a) an olefinic polysiloxane having the formula $$R_aR'_bSiO_{(4-a-b)/2}$$

and, (b) a hydrogen polysiloxane having units of the formula $$R_aSiH_bSiO_{(4-a-b)/2}$$

which process comprises incorporating in the platinum-containing mixture of ingredients a nitrile compound corresponding to the formula $$Q-\overset{H}{\underset{Z}{C}}=C-CN$$

where R is a member selected from the class of radicals consisting of alkyl, aryl, aralkyl, alkaryl, halogenated aryl, cyanoalkyl radicals, and mixtures of such radicals, R' is an organic radical selected from the class consisting of vinyl, allyl, methallyl, butenyl, and ethinyl radicals, Q is a member selected from the class consisting of hydrogen and monovalent hydrocarbon radicals, and Z is a member selected from the class consisting of halogens, hydrogen, and monovalent hydrocarbon radicals, and $a$ has a value from 0 to 3, inclusive, $b$ has a value from 0.005 to 2.0, inclusive, and the sum of $a+b$ is equal to from 0.8 to 3, inclusive.

2. The process as in claim 1 in which the platinum catalyst and nitrile compound are reacted together at about 75 to 150° C. before incorporation in the mixture of copolymerizing ingredients.

3. The process as in claim 1 in which the nitrile compound is acrylonitrile.

4. The process as in claim 2 in which the nitrile compound is methacrylonitrile.

5. The process as in claim 2 in which the nitrile compound is allyl cyanide.

6. The process as in claim 2 in which the nitrile compound is 2-chloroacrylonitrile.

7. The process as in claim 2 in which the nitrile compound is crotononitrile.

8. The process as in claim 2 in which the nitrile compound is cinnamonitrile.

9. The process as in claim 1 in which the olefinic polysiloxane is tetramethyltetravinylcyclotetrasiloxane, and a hydrogen polysiloxane is tetramethylcyclotetrasiloxane.

10. The process as in claim 9 wherein the nitrile compound is acrylonitrile.

11. A composition stabilized against premature gelation comprising (a) an olefinic polysiloxane having units of the formula $$R_aR'_bSiO_{\frac{(4-a-b)}{2}}$$

(b) a hydrogen polysiloxane having units of the formula $$R_aSiH_bSiO_{\frac{(4-a-b)}{2}}$$

(c) a platinum catalyst effective to cause copolymerization of (a) and (b) and (d) a nitrile compound corresponding to the formula $$Q-\overset{H}{\underset{Z}{C}}=C-CN$$

where R is a member selected from the class of radicals consisting of alkyl, aryl, aralkyl, alkaryl, halogenated aryl, cyanoalkyl radicals and mixtures of such radicals, R' is an organic radical selected from the class consisting of vinyl, allyl, methallyl, butenyl, and ethinyl radicals, and alkaryloxy radicals, Q is a member selected from the class consisting of hydrogen and monovalent hydrocarbon radicals, and Z is a member selected from the class consisting of halogens, hydrogen, and monovalent hydrocarbon radicals, $a$ has a value from 0 to 3, inclusive, $b$ has a value from 0.005 to 2.0, inclusive, and the sum of $a+b$ is equal to from 0.8 to 3, inclusive.

12. A composition of the matter as in claim 11 in which the alkenyl polysiloxane is tetramethyltetravinylcyclotetrasiloxane and the hydrogen polysiloxane is tetramethylcyclotetrasiloxane, and the platinum catalyst and nitrile compound are interacted prior to mixing with the polysiloxanes of (a) and (b).

13. A composition as in claim 12 wherein the nitrile compound is acrylonitrile.

14. A composition as in claim 12 wherein the nitrile compound is methacrylonitrile.

15. A composition as in claim 12 wherein the nitrile compound is crotononitrile.

16. A composition as in claim 12 wherein the nitrile compound is cinnamonitrile.

17. A composition as in claim 12 in which the nitrile compound is 2-chloroacrylonitrile.

18. A composition as in claim 11 in which the olefinic polysiloxane is tetramethyltetravinylcyclotetrasiloxane, the hydrogen polysiloxane is tetramethylcyclotetrasiloxane and the nitrile compound is acrylonitrile, which is incorporated as a mechanical blend with the platinum catalyst.

References Cited
UNITED STATES PATENTS

| | | | |
|---|---|---|---|
| 3,188,299 | 6/1965 | Chalk | 260—46.5 |
| 3,188,300 | 6/1965 | Chalk | 260—46.5 |
| 3,192,181 | 6/1965 | Moore | 260—46.5 |

DONALD E. CZAJA, *Primary Examiner.*

LEON J. BERCOVITZ, *Examiner.*

M. I. MARQUIS, *Assistant Examiner.*